United States Patent [19]
Discenzo

[11] Patent Number: 6,097,286
[45] Date of Patent: *Aug. 1, 2000

[54] STEER BY WIRE SYSTEM WITH FEEDBACK

[75] Inventor: Frederick M. Discenzo, Brecksville, Ohio

[73] Assignee: Reliance Electric Technologies, LLC, Thousand Oaks, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/940,849

[22] Filed: Sep. 30, 1997

[51] Int. Cl.$^7$ ...................................................... B60Q 1/34
[52] U.S. Cl. .......................... 340/465; 340/576; 180/79.1; 180/415
[58] Field of Search ..................................... 340/465, 576, 340/403; 180/404, 412, 422, 446, 415, 79.1, 142; 701/41, 43, 44; 73/862.06, 862.063; 364/507

[56] References Cited

U.S. PATENT DOCUMENTS

| | | | |
|---|---|---|---|
| 4,715,466 | 12/1987 | Ishii et al. ................................. | 701/42 |
| 4,895,383 | 1/1990 | Abe et al. ................................. | 180/415 |
| 5,097,917 | 3/1992 | Serizawa et al. ........................ | 340/465 |
| 5,201,380 | 4/1993 | Callahan .................................. | 180/403 |
| 5,248,214 | 9/1993 | Duffy et al. ................................. | 403/2 |
| 5,335,979 | 8/1994 | Naitou et al. ............................ | 180/446 |
| 5,490,430 | 2/1996 | Anderson et al. .................. | 73/862.324 |
| 5,600,559 | 2/1997 | Nishimoto et al. ...................... | 180/404 |
| 5,636,137 | 6/1997 | Hazelden ................................. | 364/507 |
| 5,709,281 | 1/1998 | Sherwin et al. ......................... | 180/415 |
| 5,719,766 | 2/1998 | Bolourchi et al. ......................... | 701/42 |
| 5,723,794 | 3/1998 | Discenzo .................................. | 73/800 |

*Primary Examiner*—Daniel J. Wu
*Assistant Examiner*—Van T. Trieu
*Attorney, Agent, or Firm*—Patrick S. Yoder; John J. Horn; A.M. Gerasimow

[57] ABSTRACT

A system provides feedback to an operator of a steer-by-wire system. In steer-by-wire systems, there is no direct mechanical connection between the vehicle steering wheel and the steering gears. The present invention utilizes a sensor to sense torque values at the steering gears. The sensor communicates signals back to the steering wheel as operator feedback. The sensed and communicated torque values include high frequency torque fluctuations to provide road-feel in steer-by-wire systems. Also, the torque can be used to make predictions of the operator's conditions and the condition of the steering system.

17 Claims, 1 Drawing Sheet

STEER BY WIRE SYSTEM WITH FEEDBACK

This application relates to a steer by wire vehicle control system whereby the operator is provided with feedback of the torque occurring in the steering system.

In the prior art, vehicles wheels have traditionally been turned by a direct mechanical linkage between a steering wheel, steering gears, and the actual wheels. With such systems, the operator turns the steering wheel to request that the steering gear turn the vehicle wheels. Feedback of the torque encountered by the steering system as the wheels are turned is provided to the operator through the mechanical linkage. This torque feedback can provide the operator with a sense of the road conditions, such as the traction of the vehicle wheels with the road surface. In addition, the feedback provides the operator with some sense of the condition of the components of the steering system.

More recently, it has been proposed that direct mechanical linkages be replaced by steer-by-wire systems. In a steer-by-wire system, a position encoder monitors the amount of turning of a steering wheel. The position encoder translates the amount of turning of the wheel into a desired amount of turning of the vehicle wheels. An electric signal is sent to the steering system, and the wheels are turned in response to the signals.

Steer by wire systems are seen as having great potential in that they eliminate a number of required mechanical connections and components. However, with these systems the driver is not provided with any feedback of the torque and torque fluctuations occurring in the steering system. Not only would some drivers find this undesirable, it may also be unsafe in some circumstances. As an example, without the torque feedback, drivers could be distracted or bored, and lose their attention. Also, the feedback typically provided by mechanical linkages does provide the driver with an appreciation of the traction that the vehicle is experiencing on a particular road surface, and thus allows the driver to adjust driving to the road conditions.

SUMMARY OF THE INVENTION

In a disclosed embodiment of this invention, a torque sensor senses the torque experienced by the steering mechanism during turning of a steer-by-wire system. Torque values including torque fluctuations are communicated back to the vehicle steering wheel as feedback. In this way, the operator is provided with feedback of the road conditions as the vehicle turns. This not only provides the driver with important feedback, but also prevents the driver from losing attention during driving.

Preferably, a filter removes jarring torque conditions such as might occur when riding over a bump. The filter passes steady state or nominal torque feedback back to the driver. Alternatively, torque variations due to road conditions or tire conditions may be fed back to the driver.

In further applications of this invention, by providing torque to the steering wheel, and sensing driver reaction, a prediction can be made as to the driver's physical condition. As an example, if the driver does not appear to react quickly enough to torque feedback, a prediction can be made that the driver is drowsy, intoxicated, etc. A signal, such as a light, buzzer, etc., could then be sent to the driver indicating that the driver's physical condition may be somewhat limited. Alternatively, some other function such as disablement of the vehicle may be actuated.

In addition, the torque sensor readings can predict the condition of components in the steering system. As an example, by monitoring torque during a given turn, the torque sensor read out may allow a prediction of the quality of the mechanical connections within the steering system. It could also indicate early stages of tire deterioration such as belt slippage. In this way, the torque sensor is able to provide an indication of when a particular component may be failing.

These and other features of the present invention can be best understood from the following specification and drawings, of which the following is a brief description.

DETAILED DESCRIPTION OF THE PREFERRED EMBODIMENT

Figure 1:
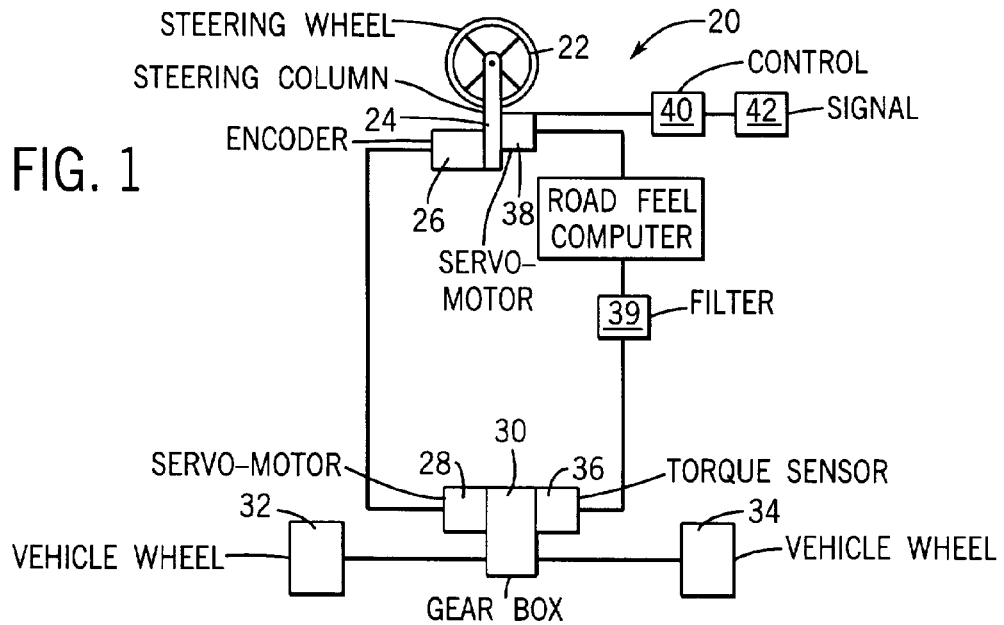
FIG. 1 is a schematic view of a system incorporating the present invention.

Steer-by-wire system 20 is shown in FIG. 1 having a steering wheel 22 to turn a steering column 24. A position encoder 26 monitors the amount of turning of the column 24 and communicates the amount to a servo-motor 28. Servo-motor 28 turns a vehicle steering gear box 30 to in turn change the angular position of vehicle wheels 32 and 34. By turning wheels 32 and 34, a vehicle associated with the wheels is turned as known. Such steer-by-wire systems are known, and the basic features and method of such systems form no part of this invention.

The present invention is directed to the inclusion of a torque sensor 36 adjacent to the gear box 30. The torque sensor is mounted in such a way to sense the torque from the wheel-steering system. The sensor may be mounted on components in the gear box, connecting rods outside the gear box, or on the shaft of the servo-motor 28 in the case of a back drivable gear box. Torque sensor 36 monitors torque as the wheels are turned. Most preferably, the sensor 36 is a high frequency torque sensor. In particular, one most preferred torque sensor is a photoelastic neural-net torque sensor such as described in co-pending U.S. patent application Ser. No. 08/537,202. The basic disclosure of this sensor is incorporated by reference. The sensor disclosed in the referenced patent application essentially could be described as placing a component on a shaft of a turning element, such as the motor for turning the steering system in this invention, and bouncing a light beam off of the component. The component will modify the light beam in different ways as the torque passing through the shaft and the component changes. Thus, by monitoring the reflected light wave, an indication can be made as to the torque passing through the shaft. The sensor preferably senses high frequency torque signals. Examples of high frequency includes 0.5 Hz to 5 Khz. However, other sensors with appropriate band width would come within the scope of this invention.

Torque sensor 36 sends a signal back to a steering wheel servo-motor 38. Servo-motor 38 provides a torque resistance to the turning of the steering wheel 22 in opposition to turning by the operator. Alternatively, or in addition to the torque resistance, an impulse may be provided to an actuator (such as servo-motor 38) connected to the steering column 24. The frequency and amplitude of the impulse sent to the steering wheel via the steering column is directly related to the actual road disturbances sensed by the torque sensor 36. The impulse frequency may be shifted and/or amplitude magnified or attenuated to produce a driver selectable road feel. The desired steering wheel "feel" is determined by the road feel computer (FIG. 1). The torque change implemented is therefore based on, or proportional to, the torque values seen by the sensor 36. The torque is thus indicative of the actual conditions of the vehicle steering system as turning is occurring or during straight driving. As an example, on a slippery road, less torque may be required to turn the wheels. Thus, only a small amount of torque would be delivered to the servo-motor 38. However, a more safe or dry surface might require a higher torque value to turn the wheels, and this higher torque value is provided back to the servo-motor 38. By comparing the amount of torque at the wheel 22 as the operator is turning, the operator will have some indication of the condition of the road.

Further, the signal from the torque sensor 36 passes through a filter 39 on its way to the steering wheel. The filter removes any jolt in the torque value such that the operator only receives the nominal or steady state torque values. Thus, should the vehicle move over a pothole, the resulting jolt in the torque value could be removed such that the operator is not exposed to this torque.

The provision of the torque to the operator will provide the operator with the feel that occurs during normal driving. In known steer-by-wire systems, there has sometimes been the tendency for driver to become bored or distracted. This invention addresses that concern.

In another feature of this invention, the torque value can also sense a reaction force from driver 22. As an example, when a particular torque is transmitted to the column 24, and the driver does not react to that torque for a predetermined period of time, perhaps at the subsecond level, then a control 40 may determine that the driver has some physical deficiency at the particular moment. The driver may be becoming sleepy, may be intoxicated, may have medical problems, or may have reduced alertness for some other reason. As an example, a single torque signal could be passed to the driver. This signal could be a quick limited turn of the steering wheel in a particular direction. No danger is provided to the vehicle, as turning the steering wheel is no longer connected to actual turning of the vehicle wheels. If the operator responds appropriate within the prescribed time interval then the steering response will also be prevented from affecting the turning of the wheels. However, if the operator does not react to that signal, then the above determination as to the physical condition of the driver may be made. In such a situation, a signal 42 may be actuated to provide an indication that the operator's physical condition is apparently impaired. The degree of impairment could be displayed in the vehicle alerting the driver of his impaired skills. Alternatively, other means of reacting to the operator's condition such as disablement of the car may also be utilized.

Also, the sensor 36 can also provide an indication to the control 40 of the quality of the steering components. If the torque values are not as expected, predictions can be made as to the quality of the various components within the steering system. As an example, if connections in the gear box are becoming loose, or some of the components are failing, then high torque values may not occur. Or sensed torque values may rapidly fluctuate from high values to low values. By monitoring these torque values and comparing them to expected values, the system can predict when a component or connection may be failing. A plant model or transfer function can be derived which incorporates state parameters such as current steering angle, vehicle speed, and commanded steering change to establish the nominal torque state values. Actual sensed torque values could be compared with model-derived values to signal a faulty steering system component. Appropriate modeling techniques can readily be employed to determine which component may be starting to fail and how critical the situation is. The various expected torque signals for particular operations could be determined experimentally from actual vehicles on the road, and the signals occurring during actual operation can be compared to the expected signals. Predictions can then be made as to the quality of the steering system components. Lifetime predictions may also be made based on the expected, nominal rate of steering system degradation with age and use.

Figure 2:
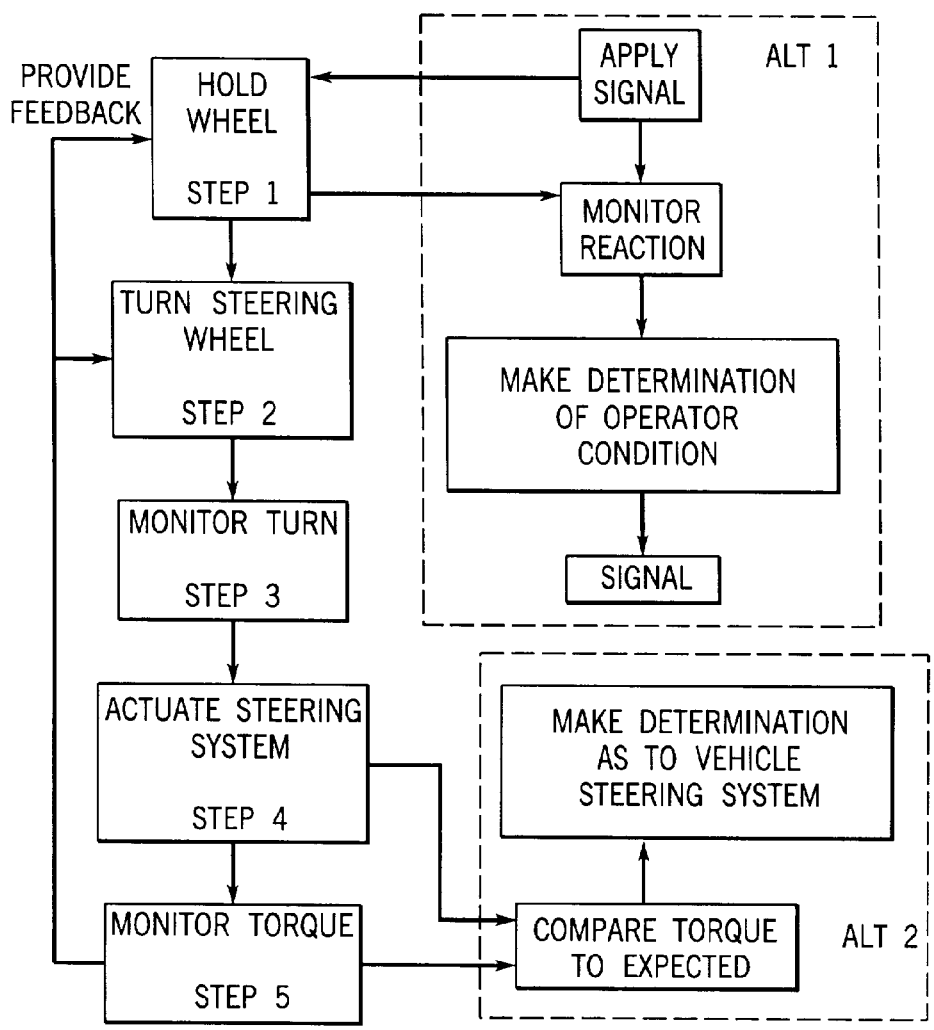
FIG. 2 is a flow chart of this invention.

FIG. 2 is a flow chart of the entire system and method along with all available options. At step 1, the operator is holding the steering wheel as is typically the case during driving. At step 2, the operator begins to turn the steering wheel. At step 3, that turning is being monitored by encoder 26. At step 4, the steering system is turned to correspond to the amount of turning of the wheel in step 2. At step 5, and during the turning, torque is being monitored. That torque is provided as feedback back to the operator as step 2 is ongoing. Thus, preferably, as the operator is turning the steering wheel, the vehicle wheels are turned, and torque is being fed back to the operator during the turn. This thus provides the operator with the feedback necessary to best drive the vehicle.

There are two alternative functions that are also shown in the flowchart of FIG. 2. As alternative 1, a signal is applied to the wheel such as a torque turn in a first direction. The driver's reaction to that torque is sensed by monitoring the resistance to the application of the signal. The control may then consider the driver's reaction and compare it to an expected reaction. A determination can then be made as to the operator's condition. If the operator's condition is determined to be indicative of some impairment, then a system reaction such as providing an operator signal, or alternatively, disabling the vehicle may be actuated.

Alternative 2, which may be used in combination with alternative 1, or alone, compares the monitor torque of step 5 to expected values. A determination is then made as to the condition of the vehicle components based upon the expected torque. Again, this will allow the control to predict when the steering system may be failing.

In addition to transferring "as-sensed" torque fluctuations to the operator, the torque values may be amplified or attenuated before being sent to the steering wheel motor. This will enable the system to reduce operator fatigue or provide very early indication of degrading road conditions or steering system deterioration. The amplification or attenuation need not be uniform over the entire frequency range but only torque at critical frequencies or fatigue-causing frequencies may need to be altered before affecting the steering wheel. Similarly, torque fluctuations occurring at one frequency may be shifted in frequency before affecting the steering wheel. This may enable the operator to more readily sense changing road conditions.

The high frequency impulses to be provided to the steering wheel may be done by providing positive or negative voltage pulses at the appropriate voltage level and frequency to the steering wheel motor. Alternatively, power switching devices such as IGBT's may be employed with a multiple-turn motor to provide a vectored force in the motor resulting in the appropriate force sensed at the steering wheel.

A preferred embodiment of this invention has been disclosed. However, a worker of ordinary skill in the art would recognize that certain modifications would come within the scope of this invention. For that reason, the following claims should be studied to determine the true scope and content of this invention.

What is claimed is:

1. A vehicle steering system comprising:
   a motor and a steering system for steering vehicle wheels, said motor being operable to actuate said steering system to turn vehicle wheels;
   a steering wheel and a position sensor for sensing turning of said steering wheel, said steering wheel being mechanically disengaged from said vehicle wheels;
   said position sensor communicating with said motor to result in turning of the vehicle wheels in response to turning of said steering wheel;
   a torque sensor for sensing torque at said steering system from the vehicle wheels during turning; and
   a servo motor coupled to said steering wheel for providing torque resistance to turning of said steering wheel based upon torque sensed by said torque sensor.

2. A system as recited in claim 1, wherein communication of torque to said steering wheel includes a second motor providing a resistance to turning of said steering wheel in response to said torque sensed by said torque sensor.

3. A system as recited in claim 2, wherein an operator's reaction to said feedback is monitored by a control.

4. A system as recited in claim 3, wherein a controller actuates a signal indicating an operator's impaired condition when the operator's reaction differs from an expected reaction.

5. A system as recited in claim 4, wherein said signal provides a signal to the operator.

6. A system as recited in claim 1, wherein said torque sensor also provides an indication of the condition of components in the vehicle's steering system.

7. A system as recited in claim 1, wherein said torque being communicated back to said steering wheel passes through a filter.

8. A method of steering a vehicle comprising the steps of:
   (1) providing a steering wheel, a position sensor to sense turning of said steering wheel, a control for a vehicle steering system, a vehicle steering system for turning a pair of vehicle wheels, a torque sensor for sensing torque in said vehicle steering system from the vehicle wheels during turning and a servo motor coupled to said steering wheel;
   (2) positioning said steering wheel to be mechanically disengaged from said vehicle wheels within said vehicle steering system;
   (3) operating said vehicle and turning said steering wheel, monitoring the amount of turning of said steering wheel and communicating said amount to said control, said vehicle steering system turning said vehicle wheels in response to turning of said steering wheel; and
   (4) sensing torque in said vehicle steering system from the vehicle wheels during turning of said vehicle wheels and as feedback to an operator providing a torque resistance at said steering wheel via said servo motor.

9. A method as recited in claim 8, wherein said torque feedback signal is provided to said steering wheel by providing a motor turning said steering wheel in opposition to the direction of turning by the vehicle operator.

10. A method as recited in claim 9, wherein an operator's response to said feedback is monitored by a control.

11. A method as recited in claim 10, wherein a signal is actuated should an operator's response differs from a predetermined value.

12. A method as recited in claim 11, wherein said signal is a warning signal provided to the operator.

13. A method as recited in claim 8, wherein said torque signal communicated back as feedback to said steering wheel is passed through a filter.

14. A method as recited in claim 8, wherein said torque signal also provides an indication of the condition of components in the vehicle steering system by monitoring the torque values and comparing them to expected values.

15. A method as recited in claim 8, wherein said sensed torque signal is modified before being sensed as feedback.

16. A method as recited in claim 8, wherein said sensed torque includes signals in a range between 0.5 Hz to 5 Khz.

17. A vehicle steering system comprising:
   a first motor and a steering system for steering vehicle wheels, said first motor being operable to actuate said steering system to turn vehicle wheels;
   a steering wheel and a position sensor for sensing turning of said steering wheel, said position sensor communicating with said motor to result in turning of the vehicle wheels in response to turning of said steering wheel;
   a torque sensor for sensing torque at said steering system from the vehicle wheels during said turning; and,
   a second motor coupled to said steering wheel for providing feedback to an operator based on said sensed torque.

* * * * *